Dec. 8, 1959 J. D. DUTCHER ET AL 2,916,484
NEOMETHYMYCIN
Filed Feb. 5, 1958
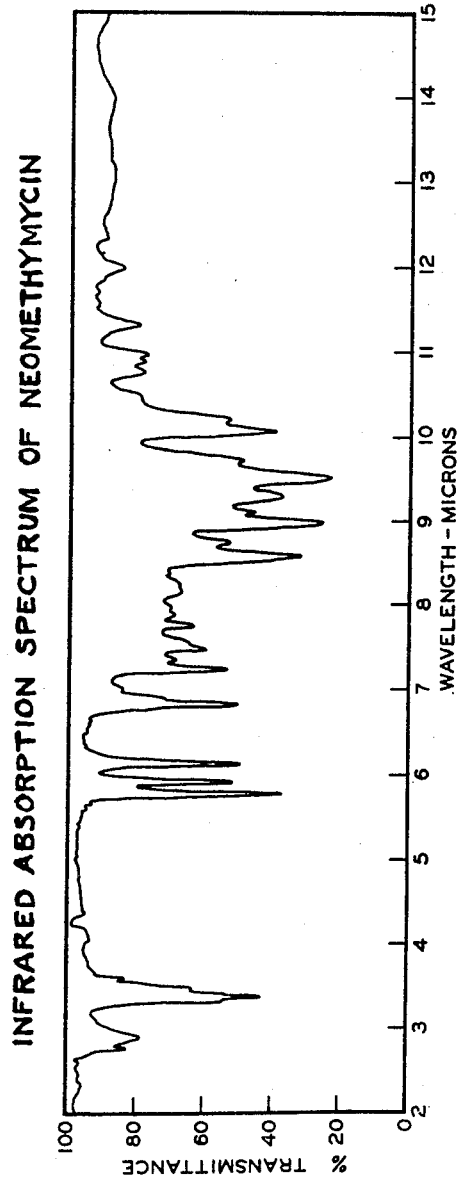

ated Dec. 8, 1959

2,916,484
NEOMETHYMYCIN

James D. Dutcher, New Brunswick, Richard Donovick, Westfield, Leon J. Heuser, Princeton, Joseph F. Pagano, Bound Brook, and David Perlman, Princeton, N.J., assignors to Olin Mathieson Chemical Corporation, New York, N.Y., a corporation of Virginia Application February 5, 1958, Serial No. 713,410

10 Claims. (Cl. 260—210)

This application is a continuation-in-part of our parent application, Serial No. 574,096, filed March 27, 1956, which in turn is a continuation-in-part of our parent application Serial No. 305,802, filed August 22, 1952, and now abandoned.

This invention relates to a new antibiotic, its salts, and to the production thereof. More particularly, it relates to the new antibiotic neomethymycin and to processes for producing it by fermentation, as well as concentrating and/or purifying it, isolating it and producing its acid-addition salts (especially salts with strong acids such as mineral acids). The new antibiotic of this invention has been termed "neomethymycin," and has in its free base form the empirical formula $C_{25}H_{43}O_7N$ and the structural formula:

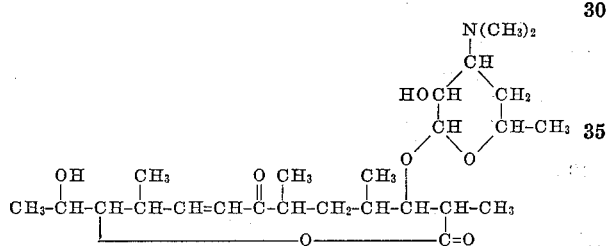

Neomethymycin is formed together with methymycin by culturing under controlled conditions, at least one of two hitherto undescribed strains of Streptomyces venezuelae, one isolated from a soil sample obtained in Florence, Italy, and hereinafter referred to as Streptomyces venezuelae WC3627, and the other isolated from a soil sample obtained in Oswego, New York, and hereinafter referred to as Streptomyces venezuelae WC3629. A culture of the living organism in each case has been made part of the Waksman collection [WC], Institute of Microbiology, Rutgers University, New Brunswick, New Jersey, for maintenance and distribution and is available from that source for practice of this invention. [It is to be specifically understood that this invention is not limited to the use of these strains, or to microorganisms fully answering the description given herein, for the production of the antibiotic of this invention. Thus, the invention includes use of mutants produced from the described microorganisms by mutating agents such as X-radiation, ultraviolet radiation, nitrogen mustards, etc.]

Each of these strains may be isolated from plates containing yeast-beef agar medium and identified in an agar streak test by high activity against Micrococcus pyogenes var. aureus, Aerobacillus polymyxa and Klebsiella pneumoniae. Each strain forms gull-grey (Ridgway) to tannish grey, sporogenous pulvinate, circular colonies on oatmeal agar. A brown water soluble pigment is produced on organic media. The vegetative hyphae are hyaline non-septate, monopodially branched and of uniform diameter. The aerial hyphae are not spiralled and are differentiated from the vegetative mycelia in that they are stained by Sudan IV. Sporulation occurs by fragmentation of distal portions of aerial hyphae. Spores are cylindrical in shape and approximately 1 micron in diameter.

The strains are capable of assimilating any of the following carbon compounds in a basal medium containing $(NH_4)_2SO_4$ as a source of nitrogen: lactose, xylose, glucose, galactose, mannose, maltose, dextrin, arabinose, starch, glycerol, salicin, citrate and acetate; fructose and melibiose support growth poorly; and growth is not supported by rhamnose, dextran, trehalose, sucrose, inulin, raffinose, sorbitol, dulcitol, inositol, mannitol, ammonium formate, or ammonium oxalate. In a basal medium containing starch as a source of carbon, the nitrogen-containing compounds ammonium sulfate, sodium nitrite, sodium nitrate, l-asparagine and l-tyrosine will support growth while acetamide and d,l-tryptophane will not.

In addition to the above characteristics, these strains are identified by their ability to grow between about 20° C. and about 40° C. on yeast-beef, soybean meal and Sabouraud's agar; to reduce nitrates to nitrites; and to produce a dark brown diffusible pigment on all media supporting good growth. Furthermore, these strains decompose gelatin, hydrolyze casein plate, show a positive test with hydrogen sulfide and tyrosinase and do not hydrolyze calcium malate but do hydrolyze starch. Poor growth is obtained on potato dextrose agar; and no growth is obtained on Czapek-Dox agar. Unlike known strains of Streptomyces venezuelae (e.g. A.T.C.C. 10595 and 10712), these new strains do not produce chloramphenicol.

Following, in tabular form (Table I) are results obtained in fermentation using Streptomyces venezuelae WC3627, showing the activity against certain organisms of the antibiotics produced. The term "du," as used in this specification, represents "dilution units," defined as the reciprocal of the highest dilution of the broth which completely inhibits the growth of a test organism, that organism being Micrococcus pyogenes var. aureus 209P unless otherwise specified.

TABLE I

| Media | pH | | Potency (du/ml.) | | | | | | B.C.G. | |
|---|---|---|---|---|---|---|---|---|---|---|
| | | | Micrococcus pyogenes var. aureus | | Klebsiella pneumoniae | | Streptococcus pyogenes C203 | | | |
| | Day 3 | Day 7 | Day 3 | Day 7 | Day 3 | Day 7 | Day 3 | Day 7 | Day 3 | Day 7 |
| Sabouraud | 6.7 | 8.4 | 154 | 25 | 35 | 35 | | | 20 | 10 |
| Soybean | 7.0 | 8.2 | <25 | <25 | | | 200 | <125 | | |
| Sabouraud | 5.0 | 6.7 | 100 | 150 | | | 2,500 | 2,500 | | |
| Do | 5.8 | 6.7 | 32 | 50 | | | 1,250 | 1,000 | | |

The antibiotic of this invention, neomethymycin, is preferably produced by submerged aerated culture of the microorganism but may also be produced by surface culture, with aeration provided by merely exposing the surface to a sterile air supply. In either case, sources of carbon for energy and nitrogen for for growth are included in the nutrient medium. As the energy-source material one may use: a carbohydrate, such as starch, soluble starch, dextrose, sucrose, and maltose; a sugar alcohol (e.g., glycerol); or a lipid, such as (1) a fatty acid, (2) a fat, or (3) a mixture of such materials. Illustrative fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fatty acids are stearic, palmitic, oleic, lauric, linoleic and myristic acids. Preferred as the energy-source materials are the carbohydrates, especially dextrose.

The sources of nitrogenous, growth-promoting factors are those normally employed in such processes. They may be natural organics (e.g., soybean meal, corn steep liquor, meat extract, casein, fish meal, liver cake and/or distillers solubles), or synthetics such as inorganic or ammonium compounds. Corn steep liquor, because of the wide variety of substances contained therein, is a valuable addition to the fermentation medium.

As in most fermentation processes, the process of the present invention is desirably carried out using a liquid medium containing mineral components enhancing growth of the organism, for example, sources of potassium, calcium, magnesium, sulfur, iron, other trace elements and phosphate. These components are desirably added to the medium unless already present therein as a component (e.g. impurity) of the crude carbon- or nitrogen-source material (e.g., corn steep liquor).

In large scale fermentation by submerged aerated culture, the pH of the medium is preferably adjusted, if necessary, to about 7 (although a pH about 5 to about 9 may be used) by the addition of buffering agents, the pH tending to become slightly alkaline (pH about 7.5–8.5) as fermentation proceeds. Fermentation temperatures from about 20° C. to about 40° C. may be used, with a temperature of about 25° C. preferred. The stirring may be effected by mechanical agitation at 100 or more r.p.m., with aeration at a superficial velocity up to about 3 or more meters per minute.

Small scale fermentation, for laboratory investigation or for the production of inoculae for larger fermentations, may be conducted in shaker flasks plugged with cotton. Thus, 250 ml. of an aqueous nutrient medium containing: soybean meal, 3%; dextrose, 2%;

$CoCl_2 \cdot 6H_2O$ 0.005%; and $CaCO_3$, 0.1% is placed in a one-liter Erlenmeyer flask, sterilized in the usual manner (i.e., by autoclaving), then adjusted to pH 7.0 with 12 N NaOH. The medium is then inoculated with the growth on an agar slant (either yeast-beef or soy infusion) of *Streptomyces venezuelae* WC3627 or WC3629, and incubation is allowed to proceed for 48–96 hours on a reciprocating shaker oscillating at the rate of 140 one-inch-strokes per minute. Other media may be used, such as aqueous media containing: (A) beef extract, 0.15%; yeast extract, 0.15%; peptone, 0.5%; dextrose, 0.5%; sodium chloride, 0.35%; $K_2HPO_4$, 0.368%; $KH_2PO_4$, 0.132%; (B) cerelose, 1%; peptone, 1%; beef extract, 0.03%; yeast extract, 0.5%; and (C) dextrose, 4%; peptone, 1%.

An antibiotic concentrate containing neomethymycin, methymycin and other therapeutically valuable antibiotics may be obtained in the acid addition salt form (usually the hydrochloride or sulfate) by: (1) alkalinizing the acid broth filtrate to pH 9–9.5, extracting with a water-immiscible organic solvent, such as ethyl ether, benzene, butanol, ethyl acetate, amyl acetate or chloroform; (2) back-extracting the organic phase with aqueous acid (usually hydrochloric or sulfuric acid) at pH 4 or less, preferably 2.5 or less; (3) neutralizing the aqueous extract to pH 6.5–7 (inorganic base or resin), and (4) freeze drying to yield the concentrate (I) as the acid salt.

Alternatively, the solvent in the extract obtained by extraction of the alkalinized acid-filtered broth may be distilled off in the presence of water, maintained at a slightly acid pH (about 6.5–7.0), and the residual aqueous solution then freeze-dried to obtain the concentrate (I). Treatment of the concentrate with alkali, of course, liberates the free base.

The antibiotics may be isolated from broth in the form of their free bases by: (1) alkalinizing the acid broth filtrate to pH 9–9.5, extracting with a water-immiscible organic solvent such as ethyl ether, benzene, butanol, ethyl acetate, amyl acetate, or chloroform; (2) back-extracting the organic phase with aqueous acid (usually hydrochloric or sulfuric acid) at pH 2–2.5; (3) alkalinizing the aqueous extract to pH 9–9.5 and extracting with one of the above mentioned water-immiscible organic solvents (preferably chloroform or benzene); (4) washing the organic solvent extract with water to remove traces of alkali; (5) allowing the solvent to evaporate in vacuo to a small volume; and then (6) adding a hydrocarbon such as hexane, petroleum ether or Skellysolve B to precipitate the concentrate (II) containing a mixture of neomethymycin and methymycin as the free bases. Other therapeutically-valuable antibiotics remain in the mother liquor.

Neomethymycin is then recovered from concentrate II as a crystalline adduct by recrystallizing at high concentration from a solvent with which it will form a soluate. The utilizable solvents are preferably relatively low-boiling chloro and bromo derivatives of methane or ethane such as chloroform, bromoform, methylene chloride, ethylene dichloride and sym. tetrachloroethane; other organic solvents such as acetate or diethyl ether will also yield an adduct.

The free neomethymycin is obtained from the adduct by warming under vacuum or by recrystallizing from a non-adduct forming organic solvent mixture such as benzene-hexane.

From the free (concentrate or crystalline) base, acid-addition salts may be prepared using standard methods. Thus, acid-addition salts with mineral acids may be prepared in aqueous solutions or under anhydrous conditions, for example, by passing hydrogen chloride gas into a solution of the free base in an appropriate solvent. Salts of other acids, such as sulfuric, phosphoric, p-aminosalicylic, p-toluene-sulfonic, methionine, sulfamic, acetic, propionic, lactic, citric, gluconic, lauric and oleic acids may be prepared.

The following chemical and physical properties of the crystalline free base, neomethymycin, inter alia, have been determined.

Soluble in alcohols, acetone, chloroform, benzene, ethyl acetate, amyl acetate and diethyl ether; slightly soluble in water and dibutyl ether; and insoluble in hexane and other aliphatic hydrocarbons.

Specific rotation measured in chloroform is $[\alpha]_D^{25} = +93°$ (c., 1.0).

Forms a crystalline product with one mole of methylene chloride having a melting point of about 154–156° C. Anhydrous neomethymycin melts at 156–158° C.

*Ultraviolet spectrum.*—The ultraviolet absorption maxium of crystalline neomethymycin in ethanol is 227.5 mμ (log. $\epsilon = 4.10$).

*Infrared spectrum.*—The infrared absorption spectrum of neomethymycin in chloroform is reproduced in the drawing. Neomethymycin shows peaks (and shoulders indicated as "sh") at the following frequencies and wave lengths:

| Frequency (cm⁻¹) | Wavelength (μ) | Frequency (cm⁻¹) | Wavelength (μ) |
|---|---|---|---|
| 3,400 | 2.92 | 1,077 | 9.30 |
| 2,940 | 3.40 | 1,050 | 9.55 |
| 2,750 | 3.65 | 1,025 | 9.75 |
| 1,730 | 5.75 | 990 | 10.10 |
| 1,700 | 5.90 | 975 | 10.25 |
| 1,640 | 6.10 | 955 | 10.50 |
| 1,460 | 6.85 | 935 | 10.70 |
| 1,380 | 7.22 | 923 | 10.85 |
| 1,360 | 7.35 | 913 | 10.95 |
| 1,335 | 7.50 | 885 | 11.30 |
| 1,290 | 7.75 | 865 | 11.55 |
| 1,265 | 7.90 | 857 | 11.70 |
| 1,240 | 8.10 | 833 | 12.00 |
| 1,165 | 8.60 | 811 | 12.33 |
| 1,150 | 8.70 | 700 | 14.30 |
| 1,115 | 9.00 | 660 | 15.20 |
| 1,100 | 9.10 | | |

*Stability.*—No loss of activity in organic or aqueous organic solvent solution at 30° C. at pH 7 over a period of one week.

A 5–10% loss of activity at pH 2 or 9.5 under the same conditions in one week.

*Neutral equivalent.*—472 (perchloric acid titration in glacial acetic acid).

*Analysis.*—Found C, 63.75; H, 9.04; N, 3.07; 0 (by difference) 24.14; N-methyl, 5.90; C-methyl, 16.76; O-methyl, 0.0.

Neomethymycin has the structural formula given hereinbefore.

The antibiotic of this invention has been found to be effective in preventing the propagation of numerous microorganisms. Following, in tabular form (Table II) are the minimal inhibiting concentrations required to prevent growth of selected microorganisms as revealed by in vitro studies using the dilution quantitative assay technique, with the antibiotic in the free-base form.

TABLE II

| Organism | MIC (γ/ml.) | |
| --- | --- | --- |
| | Neomethymycin | Methymycin |
| M. pyogenes 209P | 7 | 8 |
| M. pyogenes Wise No. 3 (resistant to penicillin, streptomycin, aureomycin) | 21 | 25 |
| M. pyogenes Wise No. 13 (resistant to streptomycin, aureomycin, erythromycin, carbomycin) | >2,000 | >2,000 |
| M. pyogenes Cahill (resistant to penicillin, streptomycin, aureomycin) | 21 | 40 |
| M. pyogenes No. 2661 (resistant to thiostrepton) | 1.5 | 1.5 |
| P. vulgaris | 170 | 170 |
| B. subtilis | 6 | 23 |
| K. pneumoniae | 2.1 | 2.1 |
| S. pyogenes | 1.6 | 1.6 |

Neomethymycin is, therefore, a physiologically active antibiotic which may be used in veterinary medicine. Because of the gram positive spectrum of neomethymycin, the antibiotic is of special utility in the control of bovine mastitis due to streptococcal or staphylococcal infections. For such purpose, it is administered in a suitable formulation, e.g., in an oleaginous vehicle of the type generally employed for instilling anti-mastitis medicaments directly through the teat canal into the infected quarter.

Furthermore, because of its in vitro activity, neomethymycin is useful in the laboratory to aid in the isolation of yeasts and molds or other fungi from materials containing both bacteria and fungi. It is incorporated in the broth or agar or other culture media after autoclaving and immediately before use in a concentration of at least 300 to 500 micrograms per ml. The source material from which the fungus or yeast is to be isolated, such as wound exudates, bits of excised animal tissue, pieces of diseased plant tissue or soil samples, is preferably subdivided by dilution or dissection and streaked on or placed in the medium as may be appropriate. During the incubation the neomethymycin prevents the growth of some or all of the bacteria and allows the yeast or fungi to grow unharmed. The difficult problem of obtaining pure cultures for diagnosis of human, animal or plant disease (of fungus etiology) is thereby materially aided.

Following are specific examples illustrative of the invention. However, these examples are not to be construed as limiting the invention.

*Example 1*

A. *Preparation of inoculum.*—A culture of *Streptomyces venezuelae* WC3627, maintained on agar slants (either yeast-beef or soy infusion agar), is used. A transfer is made from a slant to a 500 ml. Erlenmeyer flask containing 100 ml. of the following medium: glucose, 2%; soybean meal, 1.5%; CaCO₃, 0.5%; NaCl, 0.1%; CoCl₂·6H₂O, 0.0005%; tap water. The flask is incubated at 25° C. on a reciprocating shaker for 72 hours. A 10% transfer is made to each of three flasks containing 100 ml. of the above-mentioned medium and the flasks are incubated on the reciprocating shaker for 48 hours. The contents of the flasks are pooled and used as the inoculum in the fermentation described hereinafter.

B. *Fermentation.*—About 10 liters of a fermentation medium consisting essentially of soybean meal, 3.0%; NaCl, 0.1%; CaCO₃, 0.25%; CoCl₂·6H₂O, 0.0005%; glucose, 2.0%; lard oil, 0.1%; tap water, in an 18.9 liter fermentation bottle, is sterilized for 30 minutes, minus the glucose at 121° C. at one atmosphere gauge pressure. The glucose, which is added to the fermenter separately is sterilized in concentrated form (220 g./300 ml. water in a 500 ml. Erlenmeyer flask) for ½ hour at 121° C. at one atmosphere gauge pressure. To the fermenter, containing the fermentation medium is added about 3% of a culture WC3627 inoculum. Sterile air is passed into the tank at the rate of about 25.5 liters/minute and the contents of the vessel are agitated by means of a 300 r.p.m. stirrer while the tank temperature is maintained at about 25° C. Lard oil is added, as required, as an antifoam agent. After the fermentation has proceeded for 84 hours, the broth is acidified with concentrated sulfuric acid to pH 2–3, a filter aid (Hy-Flo) is added and the broth is filtered. This broth filtrate has a potency of about 2560 dilution units/ml. as measured against *Streptococcus pyogenes* C203 in a tube dilution assay.

C. *Preparation of antibiotic concentrate I.*—The broth filtrate is adjusted to pH about 7.8, then extracted twice with a 2.5 liter portions of peroxide-free ethyl ether. The ether is then allowed to evaporate from the ether extract in the presence of 650 ml. of water, kept slightly acid (pH 6.5) by addition of hydrochloric acid. The aqueous solution remaining is adjusted to pH 7.0 and lyophilized, resulting in isolation of the antibiotic concentrate (as hydrochloride salts). The weight of this product is about 3.5 g.

D. *Recovery of neomethymycin.*—The amorphous product obtained in Example 1C (concentrate I) is dissolved in 70 ml. of water, the pH raised to 9–9.5, this solution extracted twice with 35 ml. portions of chloroform, the chloroform extract concentrated to 0.1 volume and 10 volumes of Skellysolve B added to the concentrate. This mixture is stored overnight at 5° C., the crystalline precipitate then filtered off, washed with Skellysolve B and vacuum dried. The product (about 2.96 g.) now contains a mixture of methymycin, neomethymycin (as the free bases) and a small quantity of other therapeutically active antibiotics. The mother liquor contains other more soluble valuable therapeutically active antibiotics.

The 2.96 g. of product obtained in the preceding step are dissolved in 11.5 ml. of hot ethanol, cooled to 5° C., and the crystalline methymycin which has precipitated removed by filtration. After drying, this product weighs about 2.07 g.

The ethyl alcohol filtrate is evaporated to dryness, the residue is dissolved in chloroform with warming, the solution cooled to 5° C. and held at that temperature overnight, and the neomethymycin chloroform solvate removed by filtration. The yield of dried adduct amounts to about 0.45 g.

The adduct is then heated to 95–100° C. under vacuum to distil off the chloroform and yield pure neomethymycin.

*Example 2*

A. *Preparation of inoculum.*—A culture of *Streptomyces venezuelae* WC3627, maintained on agar slants (either yeast-beef or soy infusion agar), is used. A transfer is made from a slant to a 500 ml. Erlenmeyer flask containing 100 ml. of the following medium: glucose, 2%; soy-bean meal, 1.5%; CaCO₃, 0.5%; NaCl, 0.1%; CoCl₂·6H₂O, 0.0005%; tap water. The flask is incubated at about 25° on a reciprocating shaker for 72 hours. The contents of the flask are then transferred to an aerated bottle (18.9 liters capacity) containing 12 liters of the following medium: glucose, 2.0%; soybean meal, 3.0%; NaCl, 0.1%; CaCO₃, 0.5%; 1% silicone (Dow-Corning) in mineral oil, 0.2%; tap water. Fermentation is allowed to proceed for 48 hours at about 25° C. while sterile air is passed through the fermentation liquor at the rate of one liter of medium per minute. The contents of the bottle are then transferred to a germinator (378 liter capacity) containing 189 liters of the same medium as that used in the 18.9 liter fermentation described in Example 1, and incubation is allowed to proceed for 18-24 hours at about 25° C. with stirring at 120 r.p.m., aeration at 566 liters/minute, and the tank pressure at ⅔ atmosphere gauge pressure. Then 75.6 liters of this incubation product are used to inoculate three kiloliters of the following fermentation medium (in a carbon-steel tank); soybean meal, 3%; NaCl, 0.1%; CaCO₃, 0.25%; CoCl₂·6H₂O, 0.0005%; glucose, 2.0%; lard oil, 0.1%; tap water. Fermentation is then allowed to proceed for 84 hours at about 2-5° C. with stirring at 120 r.p.m., pressure at ⅔ atmosphere gauge and aeration by admission of sterile air at about 3400 liters/minute. During the fermentation, lard oil is added, as required, as an antifoam agent. After completion of the fermentation, the broth is acidified with concentrated sulfuric acid, a filter aid (Hy-Flo) is added and the broth is filtered. The broth filtrate has a potency of about 100-150 du/ml. as measured against *Micrococcus pyogenes* var. *aureus*, and a potency of about 400-600 du/ml. as measured against *Streptococcus pyogenes* C203 in tube dilution assay.

B. *Preparation of antibiotic concentrate II.*—About 4.1 kiloliters of acid filtered broth are adjusted to pH 9.5 and extracted continuously with amyl acetate. The resulting amyl acetate solution is extracted with dilute sulfuric acid at pH 2.5, this dilute sulfuric acid solution washed with 2.65 liters of chloroform which is discarded, the dilute sulfuric acid solution is adjusted to pH 9.5 and extracted twice with 2.5 liter portions of chloroform. The 5 liters of chloroform extract are concentrated to one liter at 15-20° C., and 10 P. of Skellysolve B (a hexane fraction B.P. 86-100° C.) are added gradually while agitating. The solution is agitated an additional two hours and stored at 5° C. overnight.

The precipitate is then filtered off, washed with Skellysolve B and dried in a vacuum oven at 30° C. for 48 hours yielding 183.4 g. of an antibiotic concentrate (II), a crystalline product containing neomethymycin and methymycin as the free bases.

The mother liquor from which concentrate II was removed and the Skellysolve B wash of concentrate II contain, in addition to small amounts of remaining neomethymycin and methymycin, other more soluble therapeutically valuable antibiotics.

C. *Preparation of crystalline neomethymycin.*—20 g. of the antibiotic concentrate II, prepared as described in Example 2B, are slurried in 80 ml. of diethyl ether for 18 hours at room temperature. The precipitate which remains is mostly methymycin and is removed by filtration. The dried precipitate amounts to 12 g.

The 80 cc. of ether solution containing neomethymycin and a small amount of methymycin is concentrated to ⅔ volume (55 cc.) and a small amount of methymycin (1 g.) which has precipitated is removed by filtration. To the resulting mother liquor is added 2 volumes (110 ml.) of hexane, the mixture left stand at room temperature overnight and the crystalline precipitate then filtered off, washed with hexane and dried (about 4.8 g.). This product contains mostly neomethymycin along with a small amount of methymycin. The mother liquor from which it is isolated contains other more soluble active antibiotics.

The 4.8 g. of crystalline neomethymycin obtained above is then dissolved in 17.2 cc. of chloroform, an equal amount of hexane added quickly and this mixture allowed to stand overnight. A nicely crystalline product (CHCl₃) is then filtered off and dried in a dessicator at room temperature at about 500 mm. pressure. The product weighs about 2.1 g.

*Neomethymycin hydrochloride.*—Obtained by dissolving an equivalent of the crystalline base in an equivalent of hydrochloric acid and lyophilizing the resulting solution.

*Neomethymycin sulfate.*—Obtained by dissolving equivalent amounts of the crystalline base and sulfuric acid in methanol. Evaporation of the solvent yields crude needles of the crystalline sulfate which can be recrystallized from a mixture of methanol and acetone.

*Neomethymycin acid sulfate.*—Obtained by the addition of two equivalents of methanolic sulfuric acid to a solution of the base in methanol. Evaporation of the solvent leaves a gum which is crystallized by the addition of acetone.

Using the procedure described in Examples 1 and 2, but with *Streptomyces venezuelae* WC3629 as the microorganism, the same isolated antibiotic, neomethymycin, as well as active concentrates thereof are obtained.

This invention may be variously otherwise embodied within the scope of the appended claims.

What is claimed is:

1. A compound selected from the group consisting of neomethymycin of the structural formula

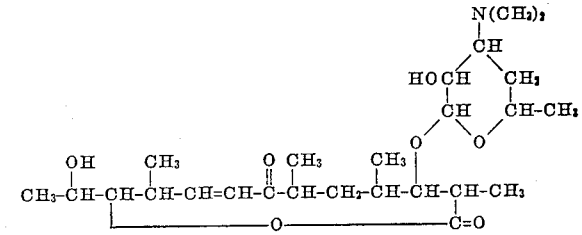

and acid-addition salts thereof.

2. Neomethymycin.
3. An acid-addition salt of neomethymycin.
4. Neomethymycin hydrochloride.
5. A sulfuric acid addition salt of neomethymycin.
6. A process for preparing neomethymycin which comprises cultivating, under aerobic conditions, at least one member of the group consisting of *Streptomyces venezuelae* WC3627 and *Streptomyces venezuelae* WC3629, in an aqueous nutrient medium containing assimilable sources of carbon and nitrogen until substantial anti-microorganism activity is imparted to the culture liquid, and recovering the neomethymycin produced.
7. The process of claim 6 wherein the culture liquid is separated from the culture solids, and neomethymycin is recovered from the culture liquid.
8. A process for the recovery of neomethymycin from an acid broth filtrate containing neomethymycin and methymycin obtained from the aerobic culturation of at least one member of the group consisting of *Streptomyces venezuelae* WC3627 and *Streptomyces venezuelae* WC3629, which comprises alkalinizing said acid broth filtrate to pH 9-9.5, extracting with a water immiscible organic solvent thereby precipitating methymycin, filtering off said precipitate to yield neomethymycin-containing mother liquor, treating the latter with a hexane solvent, and allowing the mother liquor-hexane mixture to stand, thereby precipitating crystals of neomethymycin.
9. The process of claim 8 wherein the microorganism is *Streptomyces venezuelae* WC3627.

10. The process of claim 8 wherein the microorganism is *Streptomyces venezuelae* WC3629.

References Cited in the file of this patent

Donin et al.: Antibiotics Annual, 1953–54, pp. 179–185.

Hesseltine et al.: Annal of N.Y. Acad. of Sc., 60 (1954), p. 5.

Waksman: Reprint from Bact. Rev., vol. 21, March 1957, p. 5.

Pridham: Applied Microbiology, January 1958, pp. 52–79.